(12) United States Patent
Reynolds

(10) Patent No.: US 7,379,868 B2
(45) Date of Patent: May 27, 2008

(54) METHOD AND APPARATUS FOR DIFFERENTIAL COMPRESSION OF SPEAKER MODELS

(75) Inventor: Douglas A. Reynolds, Bedford, MA (US)

(73) Assignee: Massachusetts Institute of Technology, Cambridge, MA (US)

(*) Notice: Subject to any disclaimer, the term of this patent is extended or adjusted under 35 U.S.C. 154(b) by 1123 days.

(21) Appl. No.: 10/336,653

(22) Filed: Jan. 2, 2003

(65) Prior Publication Data

US 2004/0015358 A1    Jan. 22, 2004

Related U.S. Application Data

(60) Provisional application No. 60/397,132, filed on Jul. 18, 2002.

(51) Int. Cl.
G10L 15/06 (2006.01)
G10L 15/00 (2006.01)
G06F 7/00 (2006.01)

(52) U.S. Cl. ............... 704/243; 704/238; 704/245; 707/101

(58) Field of Classification Search ............... None
See application file for complete search history.

(56) References Cited

U.S. PATENT DOCUMENTS

| | | | |
|---|---|---|---|
| 4,716,593 A | | 12/1987 | Hirai et al. |
| 5,627,939 A | * | 5/1997 | Huang et al. ............ 704/256 |
| 5,668,925 A | * | 9/1997 | Rothweiler et al. ....... 704/220 |
| 5,812,739 A | * | 9/1998 | Hirayama .................. 704/238 |
| 5,826,225 A | * | 10/1998 | Hartung et al. ........... 704/222 |
| 6,580,814 B1 | * | 6/2003 | Ittycheriah et al. ....... 382/115 |
| 6,681,207 B2 | * | 1/2004 | Garudadri ................. 704/256 |
| 2002/0046031 A1 | | 4/2002 | Hoege |

OTHER PUBLICATIONS

Panda, A. Bhattacharyya, S, Srikanthan, T. "Global Background Model Approach For Embedded Speaker Verification Systems", Proceedings of the 3rd International Symposium on Communication Systems Networks and Digital Signal Processing 2002, pp. 383-386.*
Reynolds, Douglas, A., et al., "Speaker Verification Using Adapted Gaussian Mixture Models", *M.I.T. Lincoln Laboratory*, pp. 1-21, no date given.
Reynolds, Douglas, A., "Automatic Speaker Recognition Using Gaussian Mixture Speaker Models", *The Lincoln laboratory Journal*, vol. 8, No. 2, 1995, pp. 173-192.
Schalkwyk, J., et al., "Speaker Verification With Low Storage Requirements", *IEEE*, XP-002254700, pp. 693-696, 1996.
Huang, et al., "Microsoft Windows Highly Intelligent Speech Recognizer: Whisper", *IEEE*, pp. 93-96, 1995.

* cited by examiner

*Primary Examiner*—David R. Hudspeth
*Assistant Examiner*—Matthew J. Sked
(74) *Attorney, Agent, or Firm*—Hamilton, Brook, Smith & Reynolds, P.C.

(57) ABSTRACT

A differential compression technique is disclosed for compression individual speaker models, such as Gaussian mixture models, by computing a delta model from the difference between an individual speaker model and a baseline model. Further compression may be applied to the delta model to reduce the large storage requirements generally attributed to speaker models.

24 Claims, 19 Drawing Sheets

|  | 5 BITS | 5 × D BITS | 5 × D BITS |
|---|---|---|---|
| STATE 1 | COMPRESSED ($\Delta\omega_s(1)$) — 180.1 | COMPRESSED ($\Delta\bar{\mu}_s(1)$) | COMPRESSED ($\Delta\bar{\sigma}_s(1)$) |
| STATE 2 | COMPRESSED ($\Delta\omega_s(2)$) — 180.2 | COMPRESSED ($\Delta\bar{\mu}_s(2)$) | COMPRESSED ($\Delta\bar{\sigma}_s(2)$) |
| STATE 3 | COMPRESSED ($\Delta\omega_s(3)$) — 180.3 | COMPRESSED ($\Delta\bar{\mu}_s(3)$) | COMPRESSED ($\Delta\bar{\sigma}_s(3)$) |
| ... | ... | ... | ... |
| STATE M | COMPRESSED ($\Delta\omega_s(M)$) — 180.m | COMPRESSED ($\Delta\bar{\mu}_s(M)$) | COMPRESSED ($\Delta\bar{\sigma}_s(M)$) |

FIG. 8B

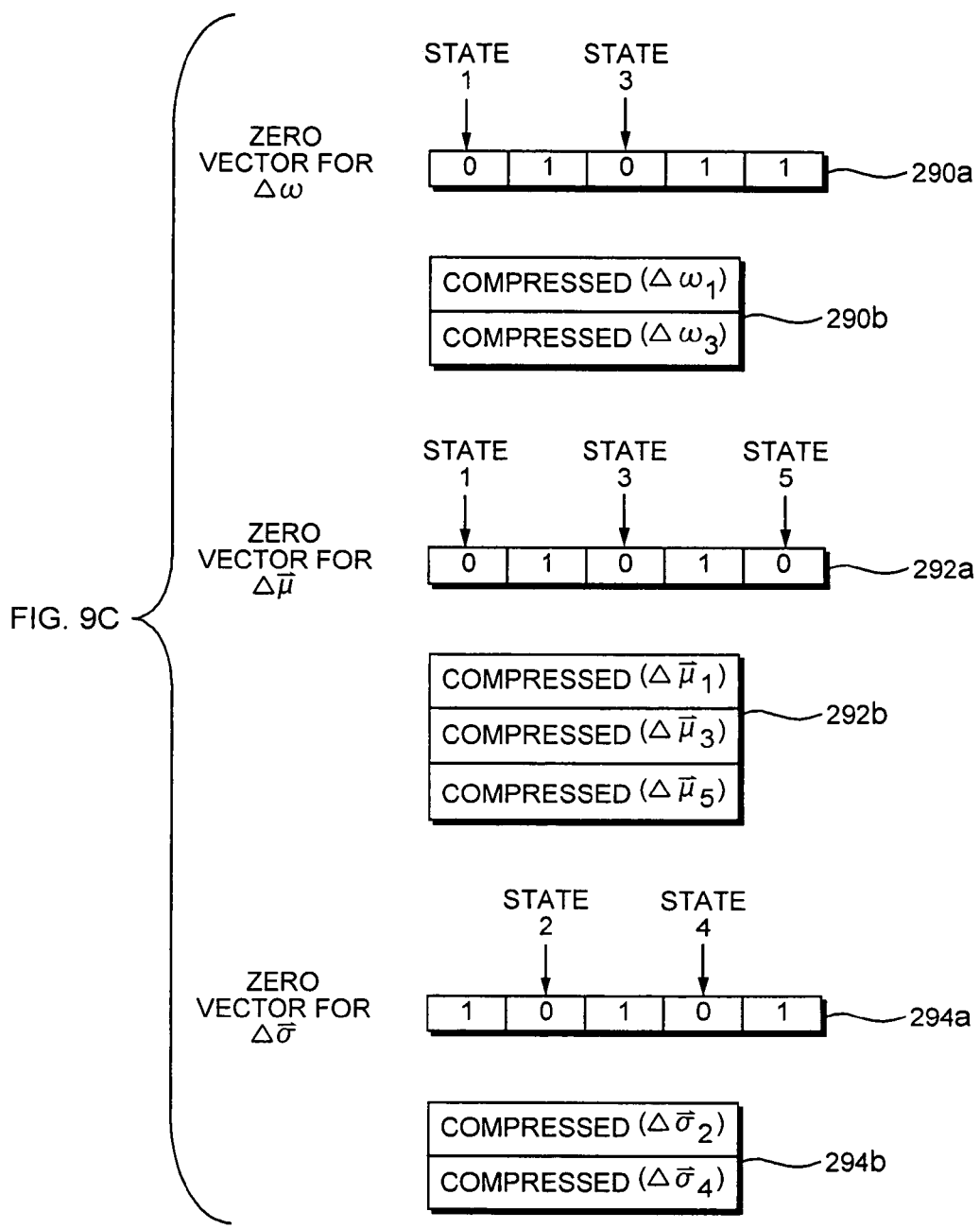

METHOD AND APPARATUS FOR DIFFERENTIAL COMPRESSION OF SPEAKER MODELS

RELATED APPLICATION

This application claims the benefit of U.S. Provisional Application No. 60/397,132, filed on Jul. 18, 2002. The entire teachings of the above application are incorporated herein by reference.

GOVERNMENT SUPPORT

The invention was supported, in whole or in part, by a grant F19628-00-C-0002 from the FBI. The Government has certain rights in the invention.

BACKGROUND OF THE INVENTION

Speaker recognition is a tool that has been increasingly deployed in a variety of applications, particularly in telecommunications. For example, speaker recognition is currently utilized for voice mail access, telephone banking, and calling cards. Speaker recognition provides the ability to recognize a person automatically from his or her voice.

A person's voice may be characterized by acoustic features that vary depending on the state of physiological attributes of the speaker. For example, as illustrated in FIG. 1, as the speaker 10 changes the shape of his or her vocal tract to produce a certain sound, the acoustic features of the speaker's voice varies with the vocal state $15a, \ldots, 15d$. Feature vectors $x_1, \ldots, x_T$ represent acoustic features in D-dimensions that are extracted from a speech waveform and which vary with vocal state.

Acoustic features that are effective for automatic speaker recognition and easily extracted from a speech waveform are frequency spectra. FIG. 2 is a diagram illustrating frequency spectra produced by different vocal states. As illustrated, vocal states $15b$, $15c$ produce frequency spectra $17b$, $17c$, respectively, that differ in number, magnitude, and frequency of spectral frequency components (i.e., formant peaks). Different speakers generally produce different frequency spectra $17b$, $19b$ for the same state $15b$. Other features known to those skilled in the art may also be employed, such as volume, clarity, speed, and pitch.

FIG. 3A is a graph illustrating distributions of frequency spectra produced by different vocal states for a speaker. In this example, each plotted point corresponds to a formant peak in two dimensions, amplitude A and frequency F. As shown, repeated tests of each vocal state typically produces a cluster of frequency spectra $20a$, $20b$, $20c$, and $20d$. Clustering occurs because (i) speech production is not deterministic (i.e., a sound produced twice is generally not exactly the same) and (ii) spectra produced from a particular vocal-tract shape can vary widely due to coarticulation effects. Thus, automatic speaker recognition systems typically employ statistical speaker models to represent the acoustic features of a person's voice.

As illustrated in FIG. 3B, the distribution of frequency spectra produced from a particular vocal state may be modeled according to a multidimensional Gaussian probability density function (pdf). Thus, an individual speaker model may be implemented as a Gaussian mixture model (GMM). A GMM speaker model is a weighted summation of Gaussian pdf's $25a, \ldots, 25d$ with state-dependent mean vectors $\mu_s(i)$, variance vectors $\partial_s(i)$, and mixture weights $\omega_s(i)$ for states $i=1, \ldots, M$. Each state in a GMM speaker model models the distribution of acoustic features associated with a particular vocal state.

FIG. 4 is a diagram illustrating a background speaker model which is generated from a collective group of speakers. A background model 65 may be generated for a specific class of individuals 50, for example, a gender-based class. As with individual speaker models, background speaker models may be represented as a weighted summation of Gaussian probability density functions with a state dependent mean vectors $\mu_B(i)$, variance vectors $\partial_B(i)$, and mixture weights $\omega_B(i)$ for states $i=1, \ldots, M$. Each state in the background speaker model 65 models the distribution of acoustic features associated with a particular vocal state $55a, \ldots, 55d$ produced by a class of speakers 50.

Background speaker models are generally used in speaker verification applications to determine whether the speaker is the person he or she claims to be. Particular speaker verification systems implement a likelihood ratio test in which an input utterance is applied to a speaker model representing the claimed speaker and to a background model representing a certain class of non-claimed speakers. Each model computes a probability indicating the "likelihood" of the input utterance being produced by the claimed speaker or not. The determination of whether the speaker is verified depends on the ratio of the probabilities meeting a certain threshold value.

For more details regarding the implementation of individual and background speaker models using Gaussian mixture models, refer to D. A. Reynolds, "Automatic Speaker Recognition Using Gaussian Mixture Speaker Models," *The Lincoln Laboratory Journal*, vol. 8, no. 2, pp. 173-192, 1995, the entire contents of which are incorporated herein by reference.

SUMMARY OF THE INVENTION

A speaker model is typically stored as sets of speaker model parameters for each modeled state. For example, FIG. 5 is a diagram illustrating the storage requirements for a speaker model implemented as a Gaussian mixture model according to the prior art. The parameters of each set includes a mixture weight $\omega_s$, a D-dimensional mean vector $\mu_s$, a D-dimensional variance vector $\partial_s$, and a determinant value (not shown).

Generally such speaker model parameters are stored using floating-point values. Thus, an M-state Gaussian mixture model with D-dimensional features that is stored using 4-byte floating-point values requires $4*M*2*(D+1)$ bytes of storage. For a typical configuration with M=2048 and D=38, a GMM speaker model requires approximately 600-700 kilobytes.

In large scale speaker recognition applications, potentially hundreds of thousands of speaker models may need to be stored, resulting in excessive storage requirements. Embodiments of the present invention provide a differential compression technique for speaker models in order to reduce storage requirements with minimal impact on recognition accuracy. Such embodiments may facilitate storage of speaker models on smart cards or hand held devices. Further, by reducing the storage requirements associated with speaker models, the overhead involved in loading such models over a data network, such as the Internet, is also reduced.

Embodiments of the present invention provide a method and apparatus for compressing speaker models, which includes providing a speaker model that is characterized by sets of speaker model parameters; providing a baseline model that is characterized by sets of baseline model parameters; and compressing the speaker model into a delta model that is characterized by sets of delta model parameters. The sets of delta model parameters may be the difference between the sets of speaker model parameters and the sets of baseline model parameters. Particular embodiments implement a background speaker model as the baseline model.

Embodiments of the invention further include providing a plurality of speaker models and compressing the plurality of speaker models into a plurality of delta speaker models from the baseline model.

Embodiments of the invention further include compressing the delta model by encoding each delta model parameter such that each of the encoded parameters is limited to a predetermined number of bits. According to one embodiment, the delta model parameters are encoded using Lloyd-Max scalar quantization.

Further embodiments of the invention may include mapping each of the sets of speaker model parameters to a corresponding set of baseline model parameters prior to generating the delta model, such that the difference between mapped sets of speaker model parameters and baseline model parameters is minimal.

Particular embodiments in which the speaker model is adapted from the baseline model may further include determining delta model parameters having non-zero values and encoding the delta model parameters having non-zero values. A delta model parameter may be determined to have a non-zero value if it is greater than a predetermined threshold value.

The speaker model and the baseline model may be implemented as Gaussian mixture models in which each set of the sets of speaker model parameters includes a weight, a mean vector, and a variance vector. Although embodiments of the invention are illustrated using Gaussian mixture models, one skilled in the art would realize that embodiments of the invention may be applied to different types of speaker models that can be represented with sets of speaker model parameters.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

FIG. 8B is a diagram illustrating the storage requirements of a speaker model after differential compression according to one embodiment.

FIG. 9C is a diagram illustrating the storage requirements of an adapted speaker model after differential compression according to one embodiment.

DETAILED DESCRIPTION OF THE INVENTION

A description of preferred embodiments of the invention follows.

In large scale speaker recognition applications, potentially hundreds of thousands of speaker models may need to be stored. For example, a single speaker model that is implemented as a Gaussian mixture model (GMM) requires approximately 600-700 kilobytes of storage space. With such storage requirements for a single model, the amount of storage needed for large scale applications is rather excessive, and may be prohibitive in some cases.

Figure 1:
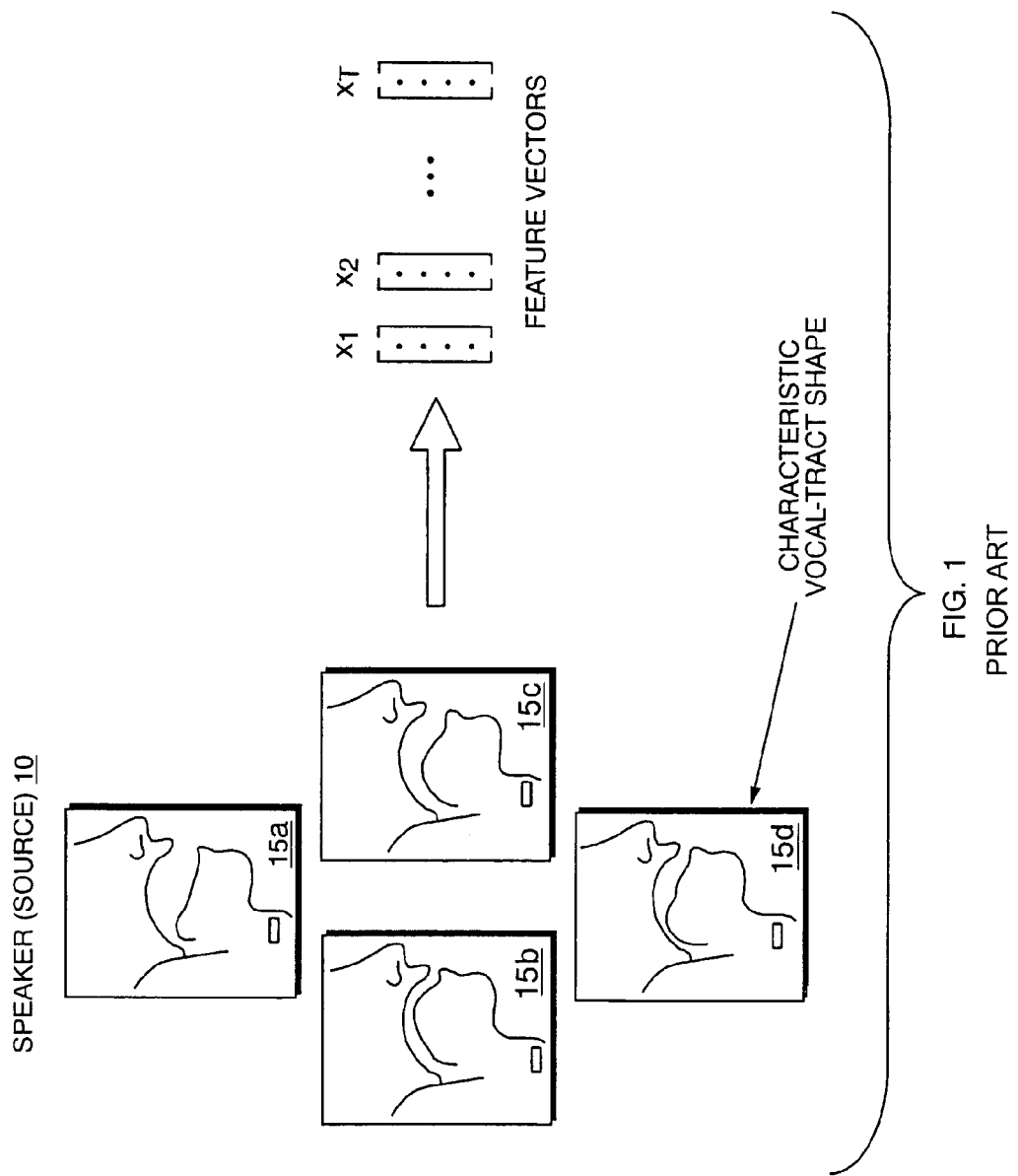
FIG. 1 is a diagram illustrating various vocal states of a speaker's vocal tract that produce state-dependent acoustic features.
Figure 2A:
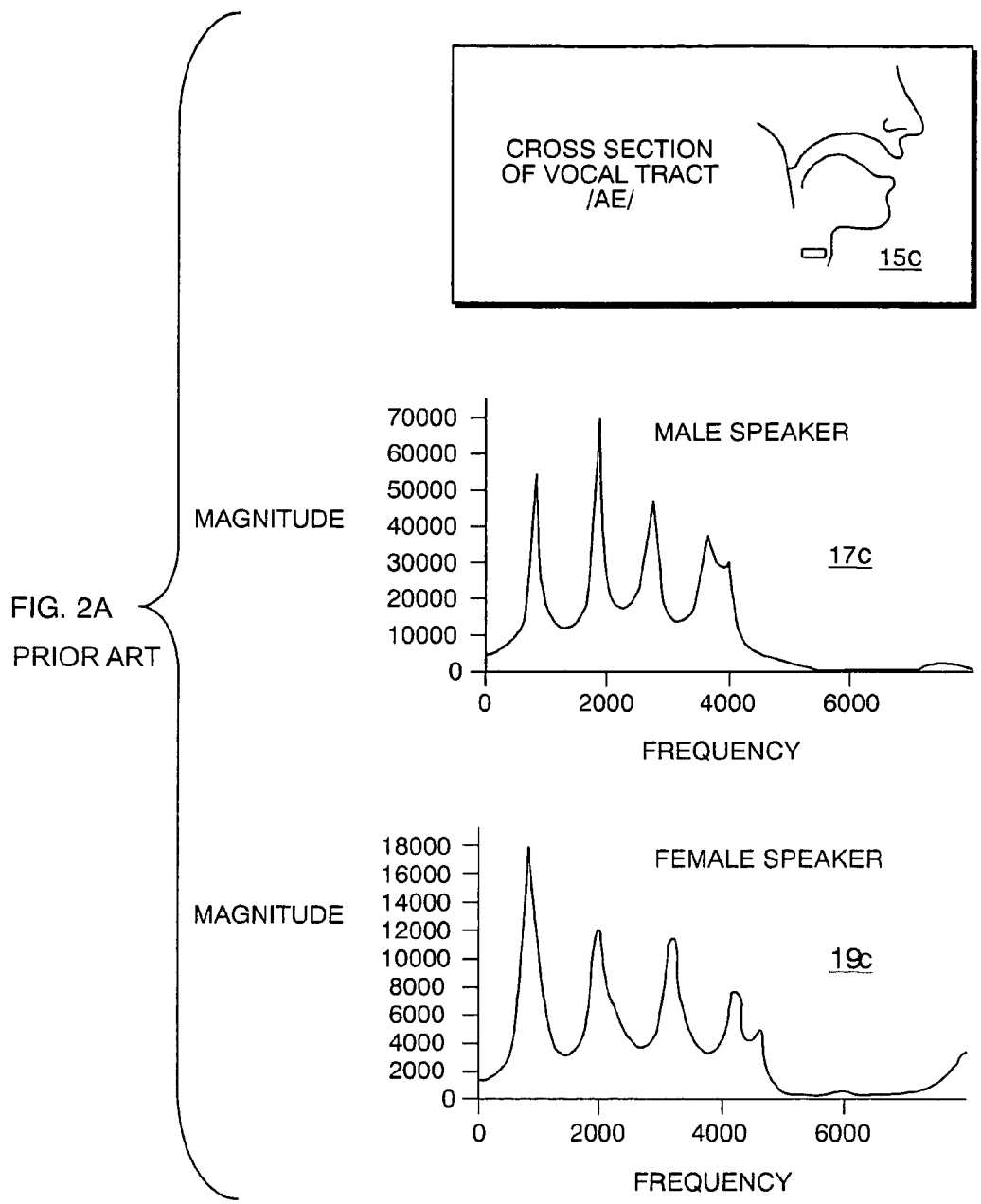
FIGS. 2A and 2B are a diagram illustrating frequency spectra produced by different vocal states.
Figure 2B:
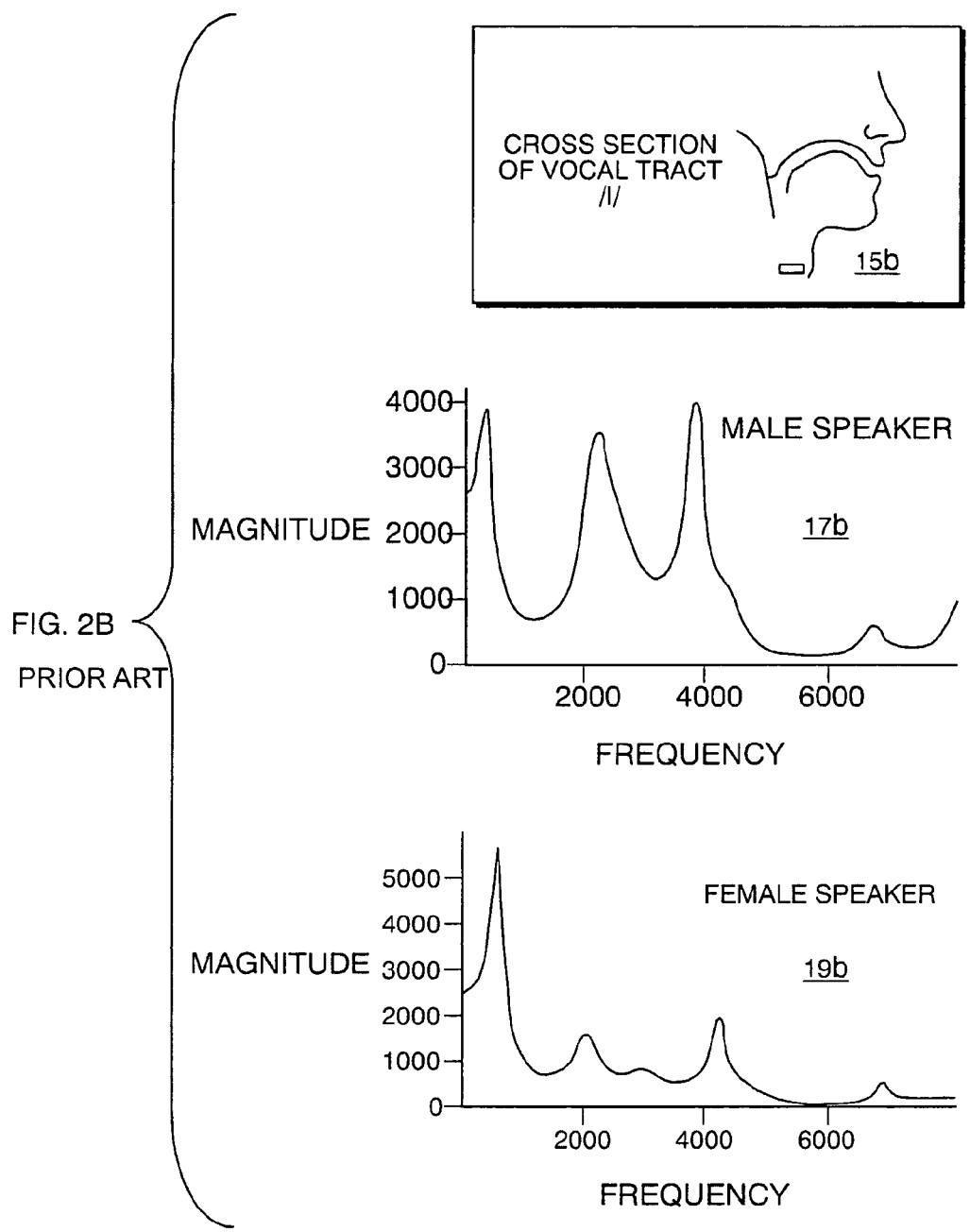
Figure 3A:
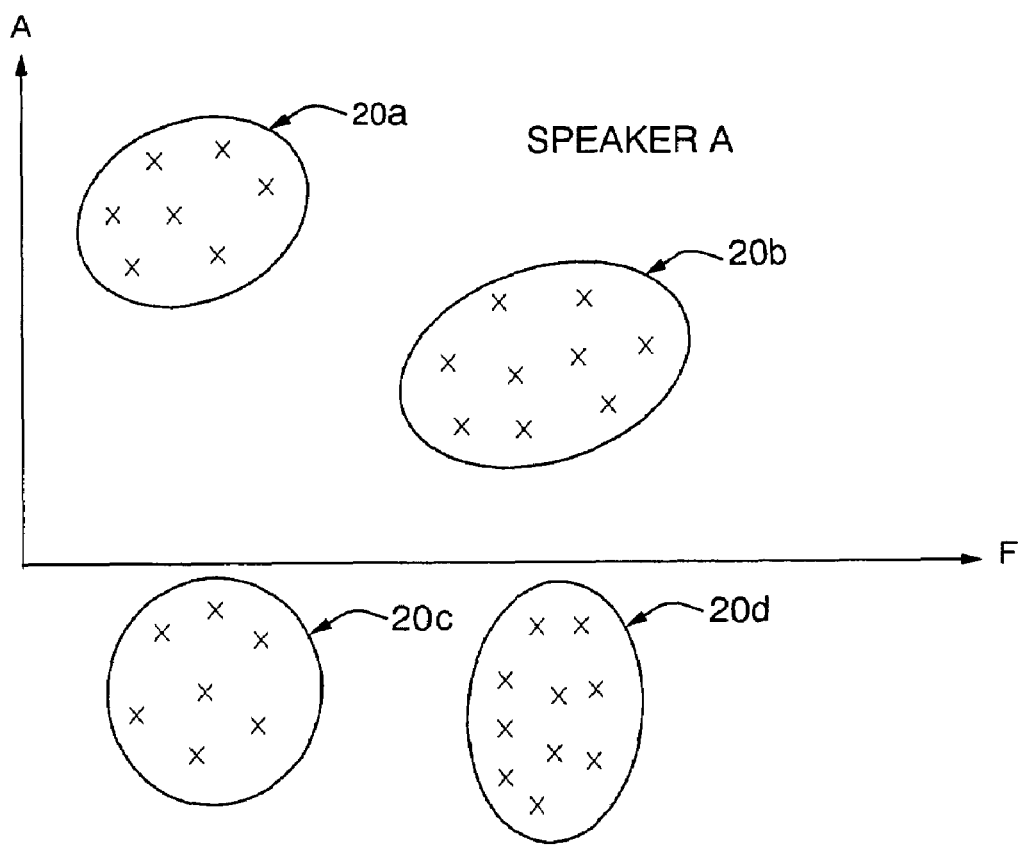
FIG. 3A is a graph illustrating distributions of frequency spectra produced by different vocal states for a speaker.
Figure 3B:
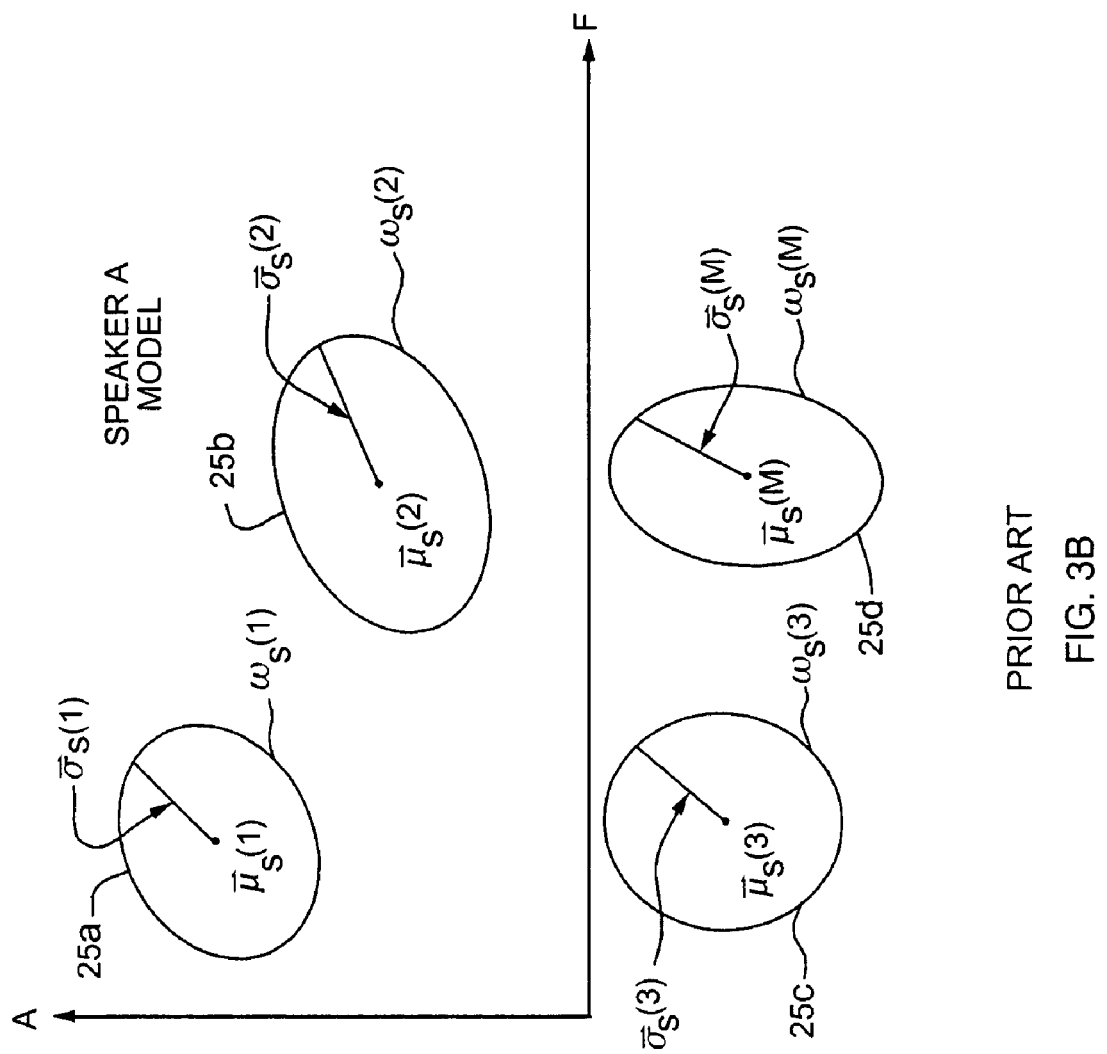
FIG. 3B is a diagram illustrating a Gaussian mixture model representing the underlying characteristics of a person's voice.
Figure 4:
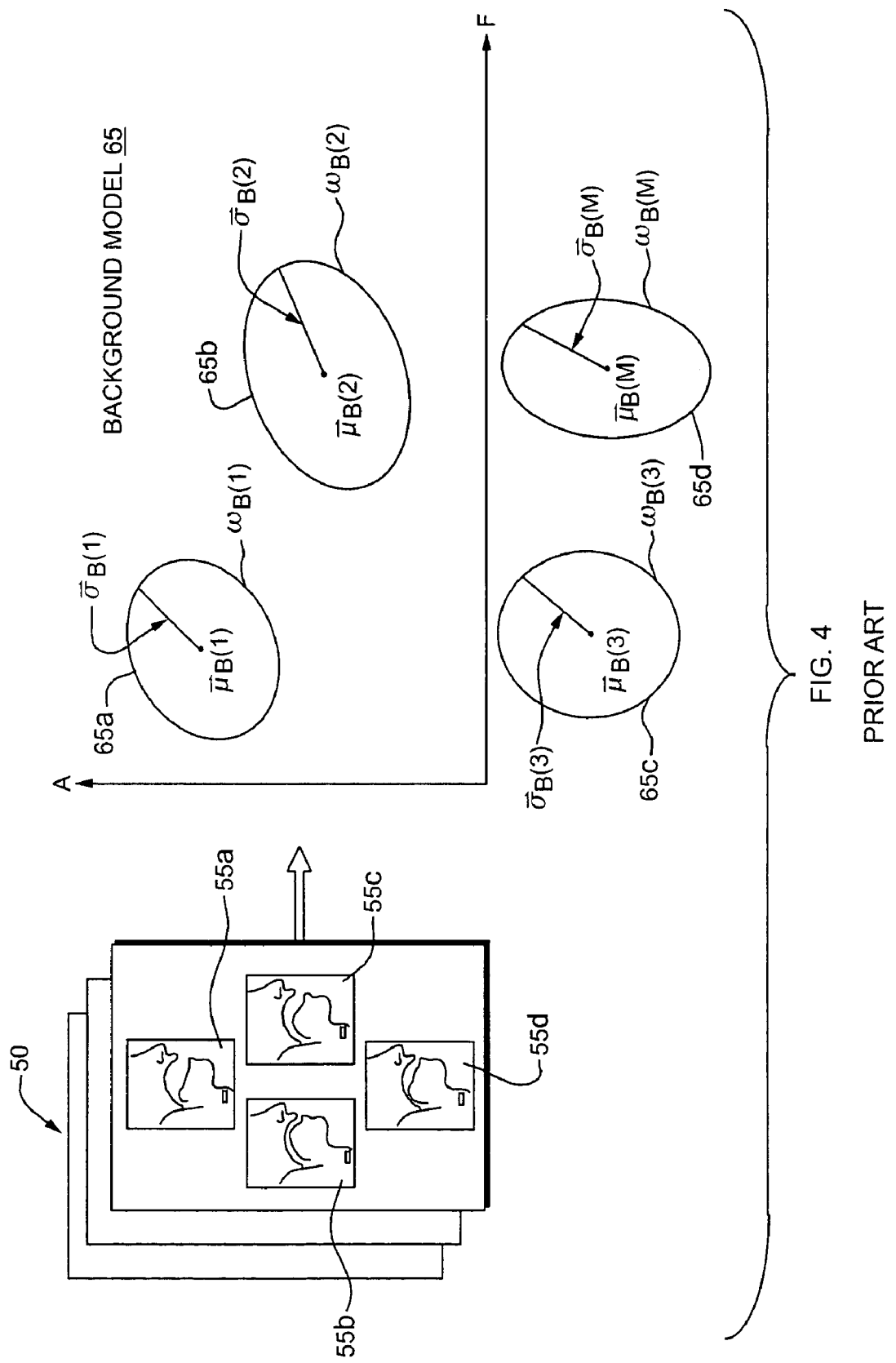
FIG. 4 is a diagram illustrating a background speaker model which is generated from a collective group of speakers.
Figure 5:
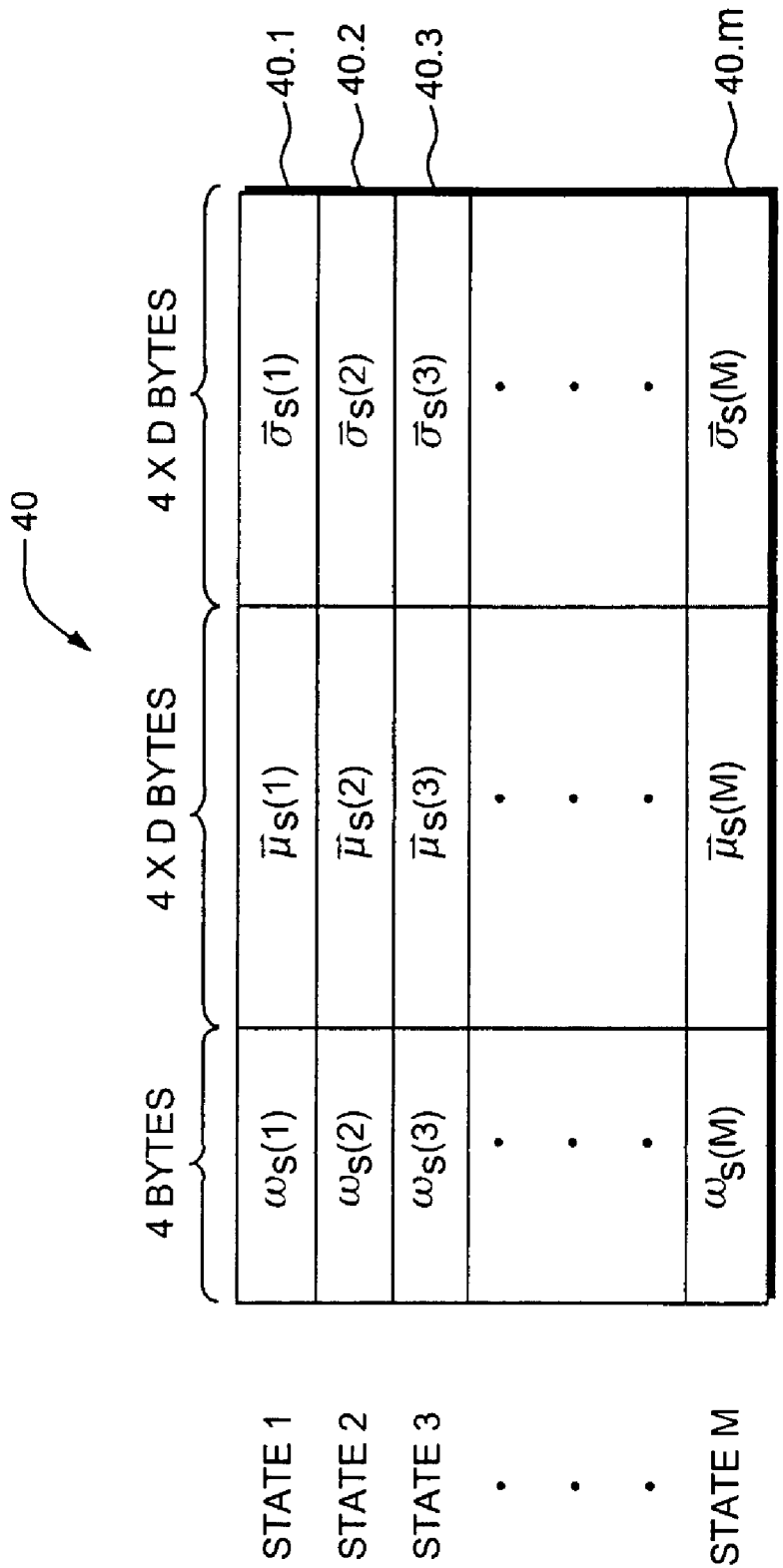
FIG. 5 is a diagram illustrating the storage requirements for a speaker model implemented as a Gaussian mixture model according to the prior art.
Figure 6:
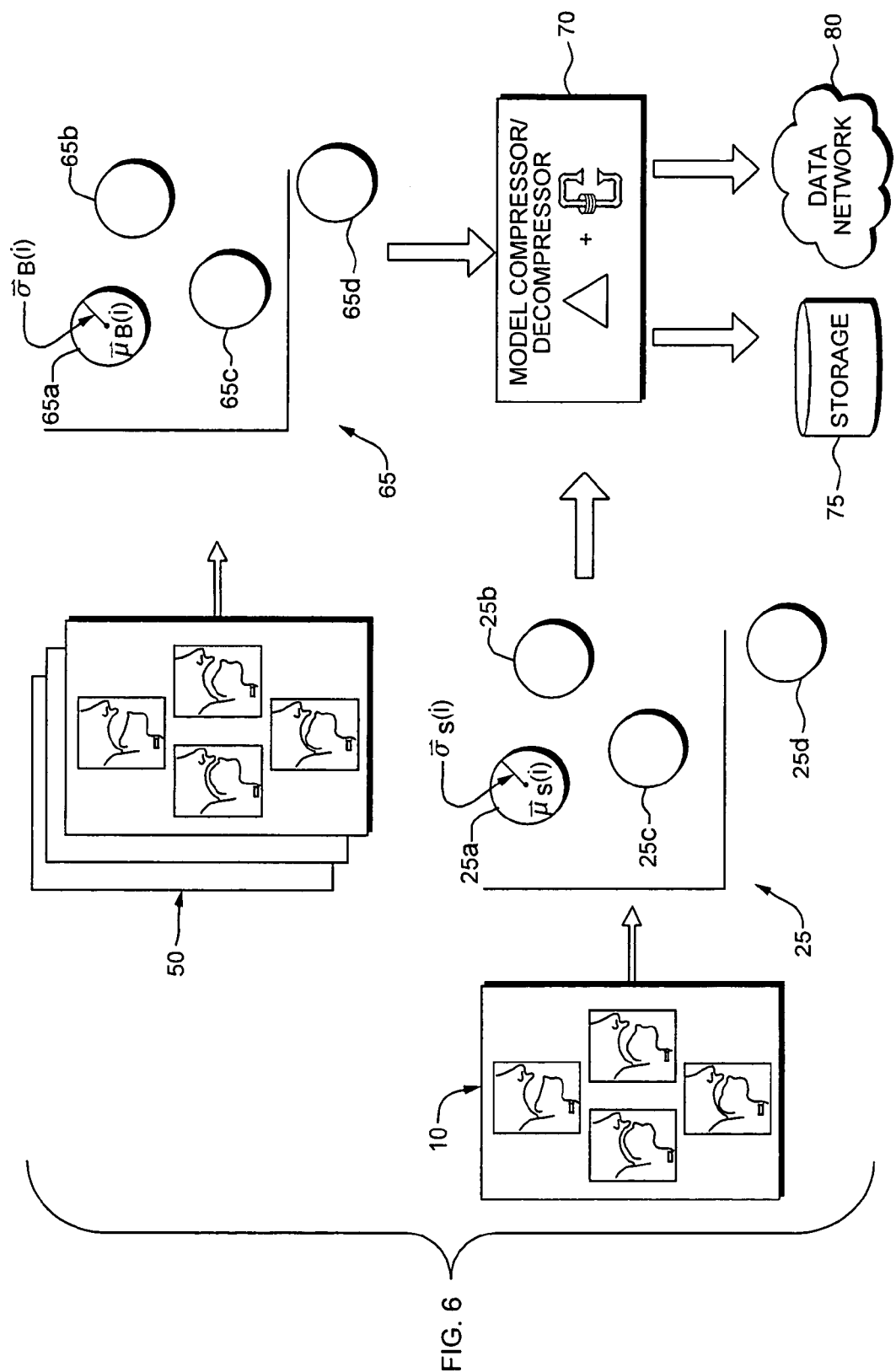
FIG. 6 is a diagram illustrating an apparatus for compressing and decompressing speaker models according to embodiments of the invention.

FIG. 6 is a diagram illustrating an apparatus for compressing and decompressing individual speaker models according to embodiments of the invention. Such embodiments may include a differential compressor 70, which compresses an individual speaker model 25 into a delta speaker model utilizing a background speaker model 65 as a baseline for computing parameters of the delta model. With the delta speaker model, the compressor 70 can apply various encoding techniques to further compress each parameter of the delta speaker model to a pre-determined number of bits.

Particular embodiments may obtain further compression by realizing that certain modeled states of an individual speaker model may be equal to, or approximately equal to, corresponding states of the background speaker model. For example, it is known that an individual speaker model may be generated having states that are adapted from a background speaker model resulting in a one-to-one correlation of modeled states. Due to this correlation, an adapted speaker model and the background model may have corresponding states in which the modeled distributions of acoustic features are equal, or approximately equal.

In such embodiments, some parameters of the resulting delta speaker model may be equal to zero or approximately zero, due to such minimal differences between the individual and background speaker models. Thus, only non-zero parameters of delta speaker model need to be stored, providing further increases in compression. The determination of whether a delta model parameter is zero is made by comparing the value of the delta model parameter with a configurable threshold value.

The compressed delta speaker model may then be stored or transmitted over a data network for further processing. The original speaker model may be regenerated by decompressing the compressed delta speaker model and combining it with the background speaker model.

Figure 7:
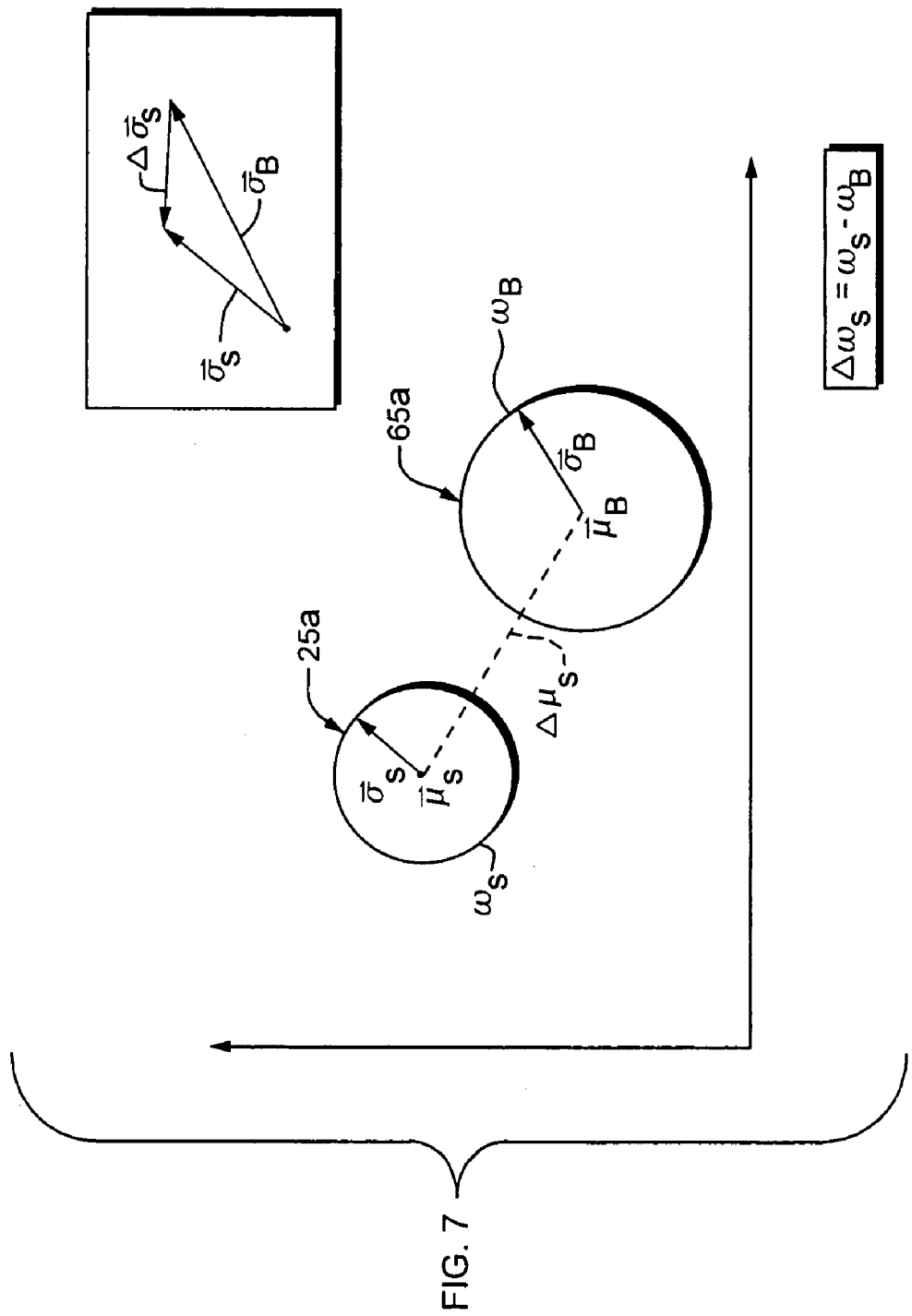
FIG. 7 is a diagram illustrating parameters of a delta speaker model according to one embodiment.

FIG. 7 is a diagram illustrating parameters of a delta speaker model according to one embodiment. As illustrated, the parameters of the delta speaker model corresponding to a particular state may include a delta mean vector $\Delta\mu_s$, a delta variance vector $\Delta\partial_s$, and a delta mixture weight $\Delta\omega_s$. The delta mean vector $\Delta\mu_s$ is determined by vector subtraction of mean vector $\mu_s$ of the speaker model 25a and the mean vector $\mu_B$ of the background model 65a. The delta variance vector $\Delta\partial_s$ is determined by vector subtraction of variance vector $\partial_s$ of speaker model 25a and the variance vector $\partial_B$ of background model 65a. The delta mixture weight $\Delta\omega_s$ is determined by the difference between the mixture weight $\omega_s$ and of the speaker model 25a and the mixture weight $\omega_B$ of the background model 65a.

Figure 8A:
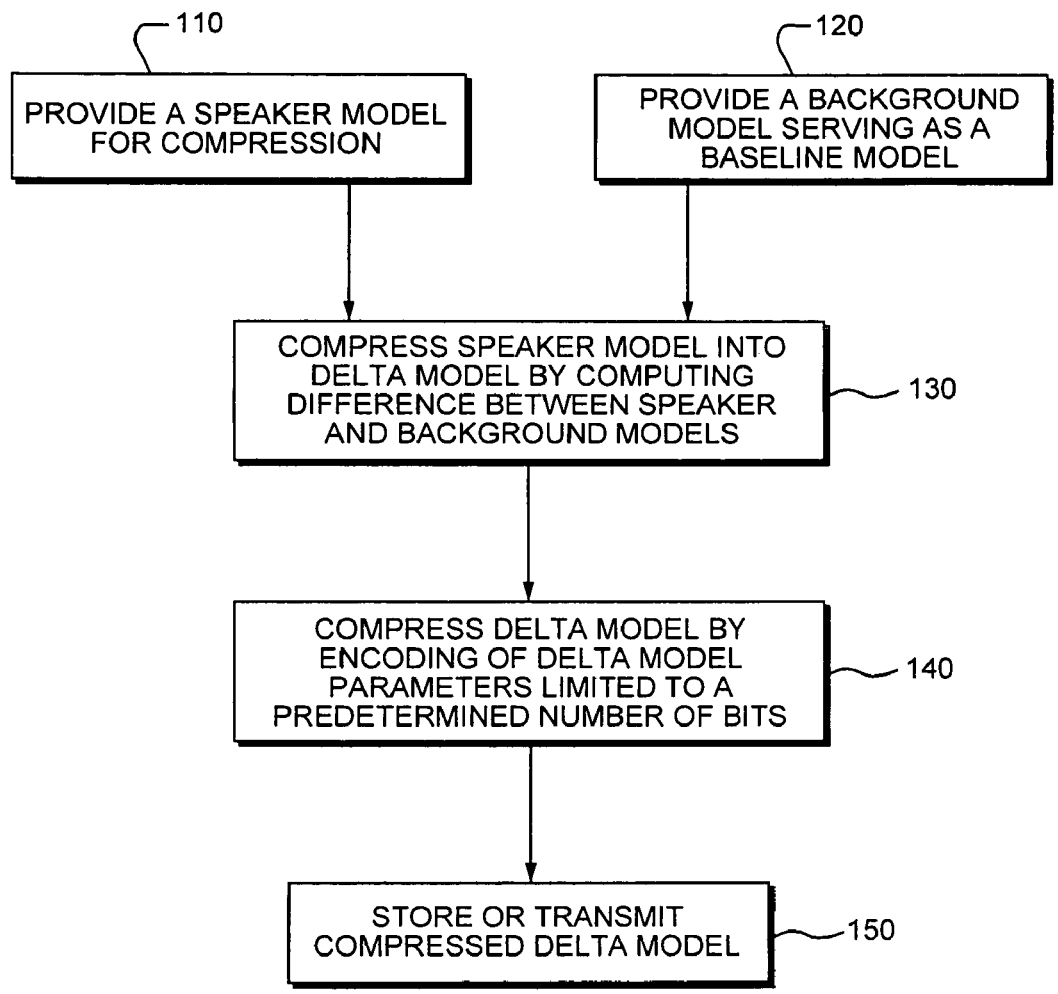
FIG. 8A is a flowchart illustrating a method of differential compression on a speaker model according to one embodiment.

FIG. 8A is a flowchart illustrating a method of differential compression on a speaker model according to one embodiment.

At 110, a speaker model that is characterized by sets of speaker model parameters is provided for compression. Each set of speaker model parameters may model the distribution of acoustic features produced from a particular vocal state of the speaker. For GMM speaker models, a set of speaker model parameters may include a mixture weight $\omega_s$, D-dimensional mean vector $\mu_s$, and D-dimensional variance vector $\partial_s$. According to one embodiment, D may be equal to 38 dimensions, while the number of M states modeled for a particular speaker may be 2,048 states.

At 120, a background model is provided as a baseline model that is characterized by sets of background model parameters. Each set of background model parameters may model the distribution of acoustic features produced from a particular vocal state of a collective group of speakers. For GMM background models, each parameter set may include a mixture weight $\omega_B$, a D-dimensional mean vector $\mu_B$, and a D-dimensional variance vector $\partial_B$. According to one embodiment, D may be equal to 38 dimensions, while the number of M states modeled for a particular class of speakers may be 2,048 states.

At 130, the speaker model is compressed into a delta model by computing the difference between speaker model parameters and background model parameters of each state. For example, a speaker model with parameters $\lambda_s=\omega_s(i)$, $\mu_s(i)$, $\partial_s(i)$ and a background model with the parameters $\lambda_B=\omega_B(i)$, $\mu_B(i)$, $\partial_B(i)$ for i=1 to M, the delta model parameters may be computed according to the following equations:

$$\Delta \log \omega_s(i) = \log \omega_s(i) - \log \omega_B(i) \quad (1)$$

$$\Delta\mu_s(i) = \mu_s(i) - \mu_B(i) \quad (2)$$

$$\Delta\partial_s(i) = \partial_s(i) - \partial_B(i) \quad (3)$$

for i=1, . . . , M.

These delta model parameters require less bits to encode as compared to the number of bits required to encode the original speaker model parameters. For example, if the values of the speaker model parameters range to 100 units, 100 quantization levels would be necessary for one unit resolution. If the background model parameters range to the same order of magnitude, the range of the delta model parameters might only be up to 10 units, resulting in the need to encode for only 10 quantization levels for the same one unit resolution.

At 140, the delta model parameters may be further compressed by encoding the delta model parameters such that the encoded parameters are limited to a predetermined number of bits. According to one embodiment, the delta model parameters may be encoded using a quantization technique, such as Gaussian distribution Lloyd-Max scalar quantization. Such quantization may include a table look-up of indices in pre-computed quantization tables. In order to limit the size of such tables, the delta model parameters may be shifted and scaled to zero mean, unit standard deviation values prior to quantizing. The parameter may be shifted and scaled using the following general equation:

$$\Delta \log y_s(i) = (\Delta \log y_s(i) - \text{mean}(\Delta \log y_s(i)))/\text{std}(\Delta \log y_s(i))$$

where $y_s(i)$ is either $\omega_s(i)$, $\mu_s(i)$, or $\partial_s(i)$.

Each of the scaled delta parameters may then be quantized to an N-bit index of a Lloyd-Max scalar quantization table. Typically 4-5 compression factors can be achieved with minimal loss in model accuracy.

At 150, the compressed delta model is then placed in storage or transmitted across a data network for further processing and/or storage.

FIG. 8B is a diagram illustrating the storage requirements for a speaker model implemented as a Gaussian mixture model after differential compression according to one embodiment. As illustrated, sets of compressed delta model parameters 180.1, . . . , 180.m are stored for each modeled state of the speaker model. Rather than storing each parameter with 4-byte floating-point values, the delta model parameters are encoded with a limited number of bits (e.g., N=5 bits). For example, when using an N=5 bit quantization on the delta model parameters compressed from a speaker model having 2,048 states and 38 dimensional features, the compressed delta model requires M*(2*D+1)*N/8 bytes of storage, which is equal to 98,560 bytes or 96 kilobytes. This represents approximately a 6.5 reduction factor.

In the embodiments illustrated in FIGS. 8A and 8B, any correspondence of speaker model parameter sets and background model parameter sets may be utilized in computing the delta model parameters. In other words, a set of delta model parameters may be computed from a speaker model parameter set and a background model parameter set that do not correspond to the same vocal state. This may result in the calculation of the delta model parameters having values that are greater than if the modeled states of the speaker model and background model had been aligned according to same vocal states.

Figure 9A:
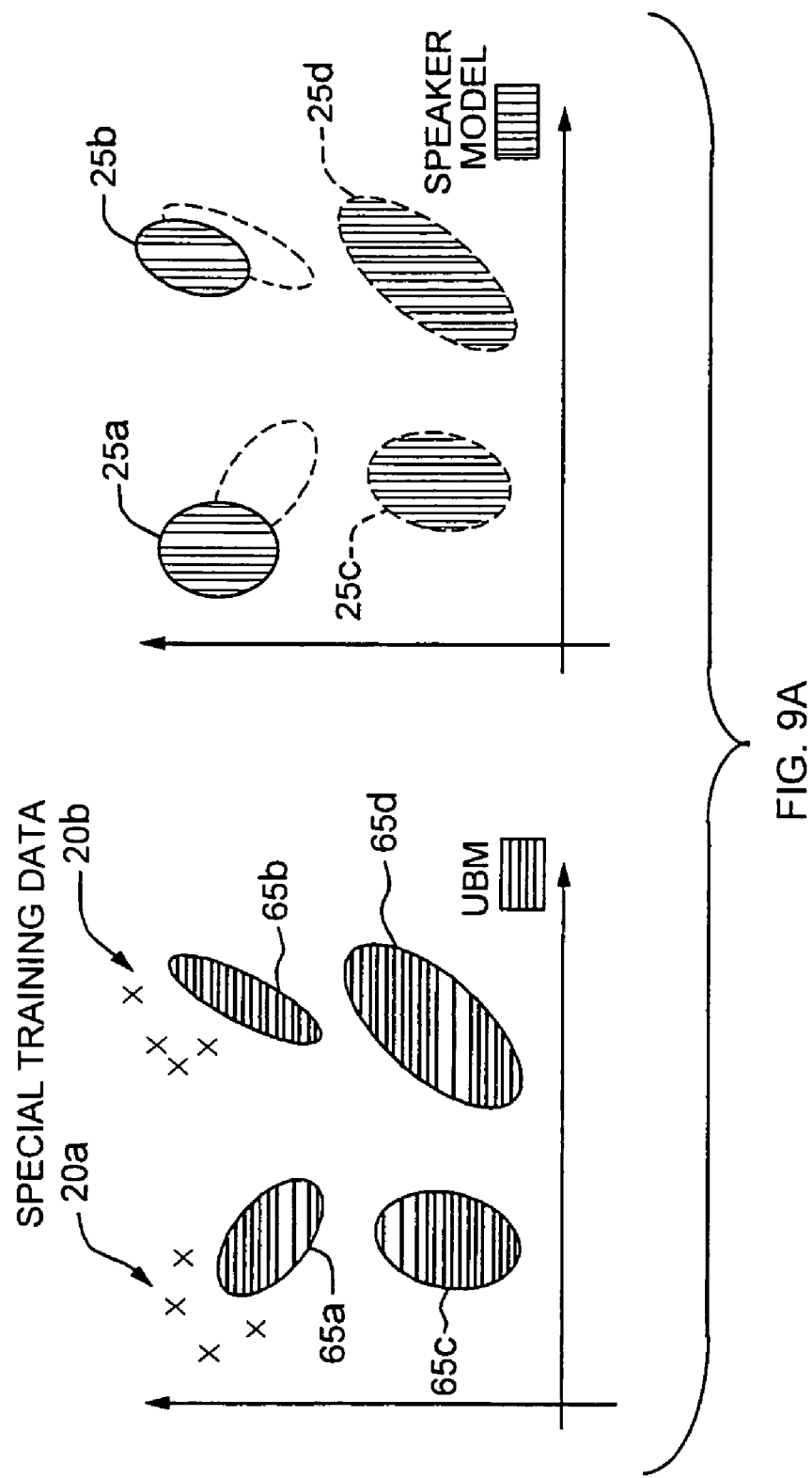
FIG. 9A is a diagram illustrating a speaker model that is adapted from a background speaker model according to one embodiment.
Figure 9B:
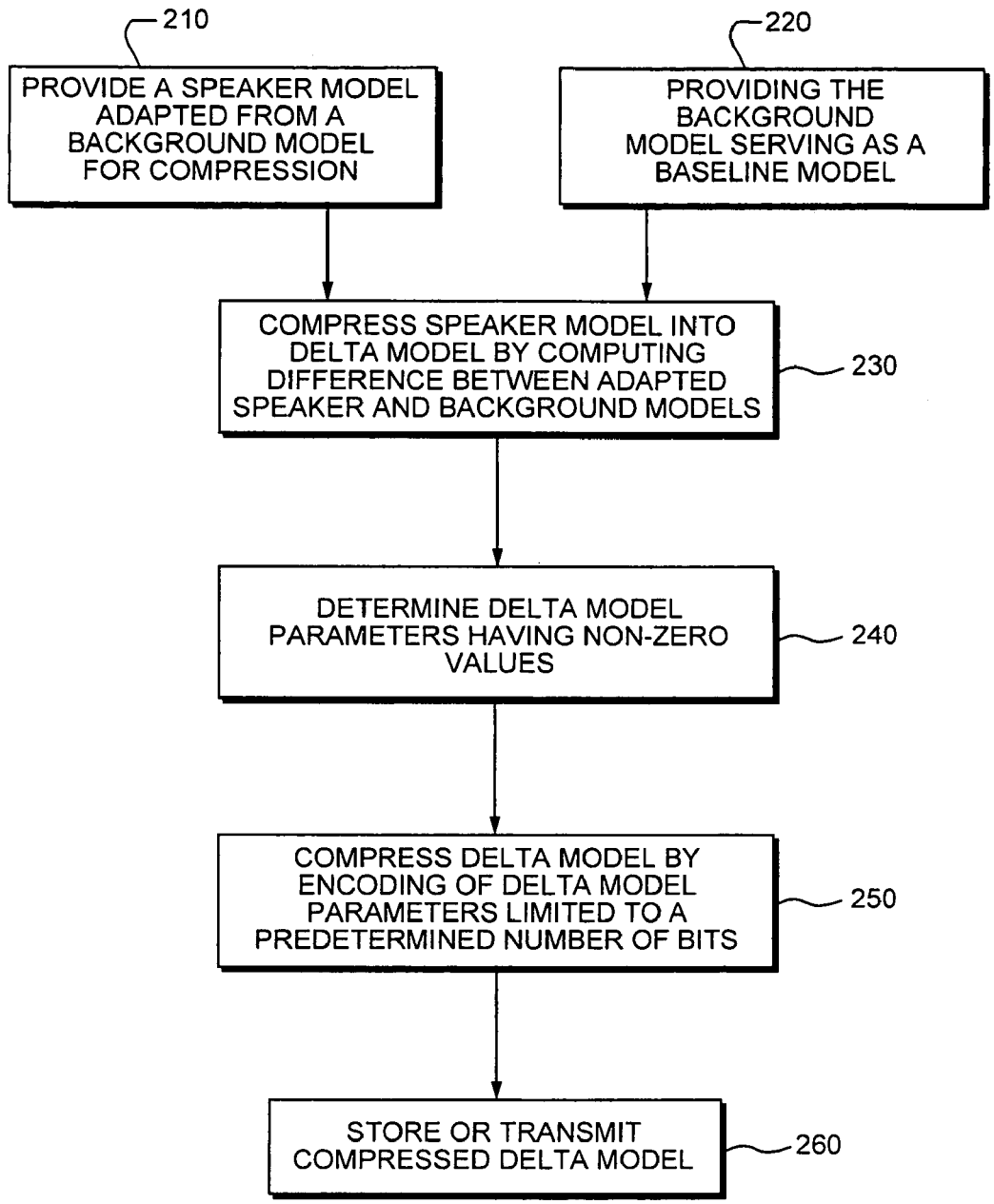
FIG. 9B is a flow chart illustrating a method of differential compression on an adapted speaker model according to one embodiment.
Figure 10A:
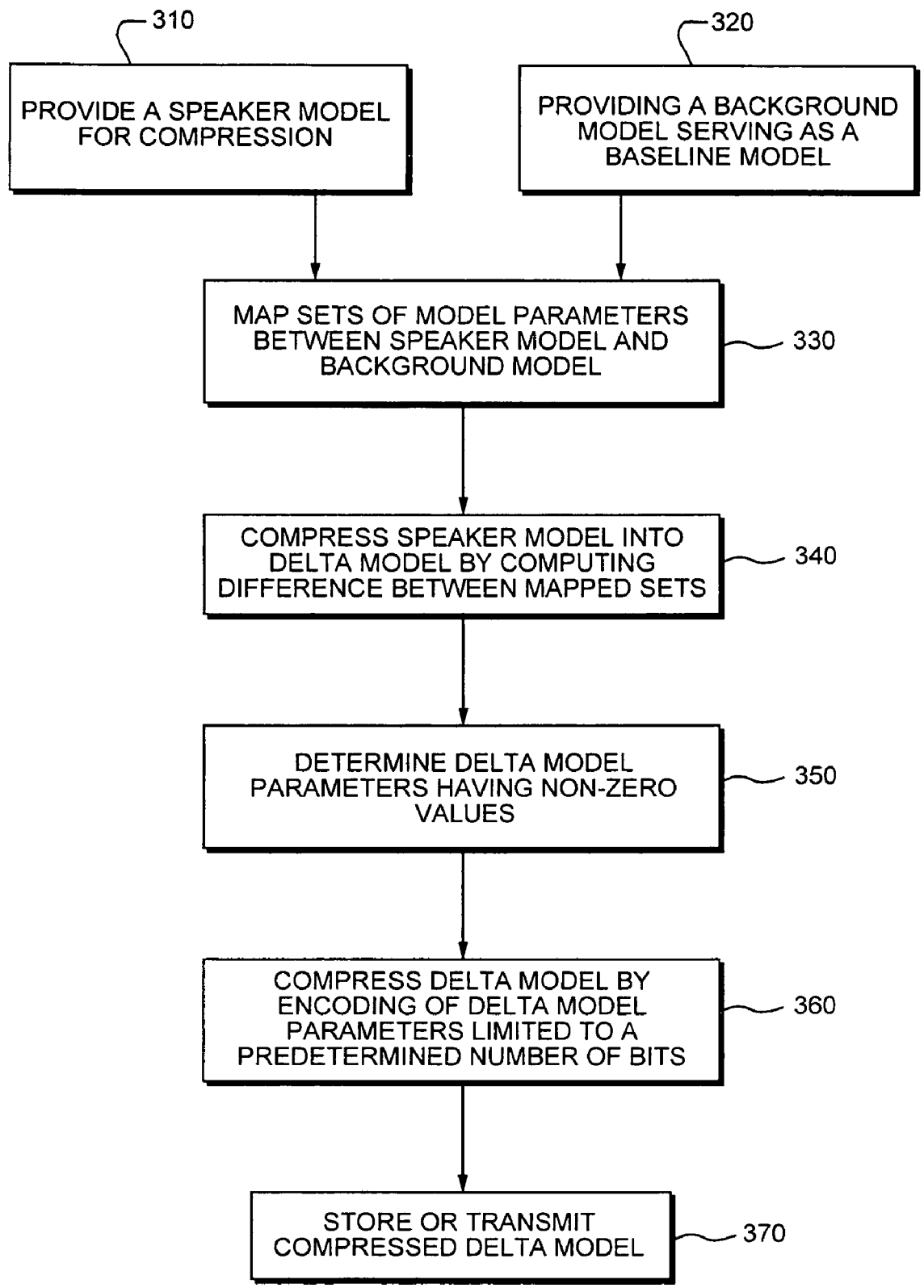
FIG. 10A is a diagram illustrating a method of differential compression on a realigned speaker model according to one embodiment.
Figure 10B:
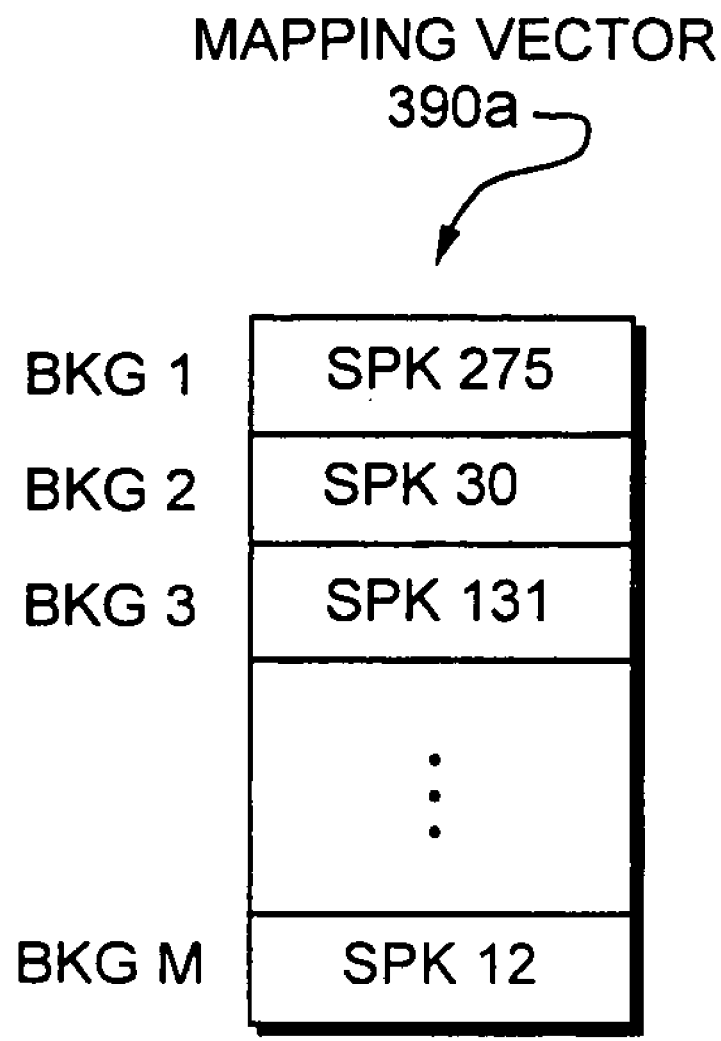
FIG. 10B is a pictorial representation of a mapping vector according to one embodiment.

Embodiments of the invention further include a method and apparatus for aligning the modeled states of a background model and a speaker model. According to one embodiment, a speaker model is originally generated having its modeled states adapted from the states of a background model. This results in the adapted speaker model and the background speaker model having modeled states i=1, . . . M associated with the same vocal state. FIGS. 9A-9C are diagrams illustrating differential compression on an adapted speaker model according to one embodiment. According to an alternative embodiment, the modeled states of the speaker model and background model are aligned to minimize the difference represented in the delta model. FIGS. 10A-10B are diagrams illustrating differential compression of a speaker model having its modeled states aligned with the modeled states of a background model according to one embodiment.

FIG. 9A is a diagram illustrating a speaker model that is adapted from a background speaker model according to one embodiment. In this embodiment, the speaker model is originally derived by adapting the parameters of the background model using the speaker's training speech in a form of Bayesian adaptation. Such adaptation results in the states of the background model corresponding directly to the states of the speaker model.

According to one embodiment, adaptation of the speaker model is a two step estimation process. In the first step, estimates of sufficient statistics of the speaker's training data are computed for each state in the background model. These statistics may be the count, and the first and second moments required to compute the mixture weight, mean, and variance. These "new" sufficient statistic estimates are then combined with the "old" sufficient statistics from the background model parameters for each state using a data-dependent mixing coefficient. The data-dependent mixing coefficient is designed so that states with high counts of data from the speaker rely more on the new sufficient statistics for final speaker model parameter estimation, while states with low counts of data from the speaker rely more on the old sufficient statistics for final speaker model parameter estimation. Using a data-dependent adaptation coefficient is a way of controlling how much new training data should be observed before the new parameters begin replacing the old parameters from the background model in order to generate the new speaker model. For more details regarding the adaptation of speaker models from background speaker models, please refer to D. A. Reynolds, et al., "Speaker Verification Using Adapted Gaussian Mixture Models," *Digital Signal Processing*, vol. 10, no. 1-2-3, January 2000, pp 19-41.

FIG. 9B is a flow chart illustrating a method of differential compression on an adapted speaker model according to one embodiment.

At 210, a speaker model adapted from a background model is provided for compression. Since the speaker model was adapted from the background model, the speaker model and the background model may have corresponding states in which the modeled distributions of acoustic features are equal, or approximately equal.

At 220, the background model from which the speaker model is derived is provided, serving as a baseline model.

At 230, the speaker model is compressed into the delta model by computing the difference between the adapted speaker model parameters and the background model parameter sets of each state, as described at 130 of FIG. 8A. Thus, for a GMM speaker model, the delta model parameters are $\Delta \log \omega_s(i)$, $\Delta \mu_s(i)$, and $\Delta \partial_s(i)$ for $i=1, \ldots, M$.

At 240, delta model parameters having non-zero values are determined to prevent unnecessary storage of delta model parameters having a zero or approximately zero values. Rather, the delta model parameters that have zero or approximately zero values may be identified in data structures, such as an M-bit flags, that correspond to each parameter type. When a parameter corresponding to a particular state is zero or approximately zero, a single bit in the M-bit flag for a particular parameter type is set to indicate that the parameter for that state is zero. The following equations illustrate how the zero vectors are calculated for each parameter type (i.e., weight, mean, and variance).

zero-weight $(i)=1$ if $\Delta \log \omega_s(i) \geq \epsilon$ 0 if $\Delta \log \omega_s(i) < \epsilon$ (4)

zero-mean $(i)=1$ if $\|\Delta \mu_s(i)\| \geq \epsilon$ 0 if $\|\Delta \mu_s(i)\| < \epsilon$ (5)

zero-variance $(i)=1$ if $\|\Delta \partial_s(i)\| \geq \epsilon$ 0 if $\|\Delta \partial_s(i)\| < \epsilon$ (6)

where $i=1, \ldots, M$.

At 250, with reference to the zero vectors for weight, mean and variance, the delta model may be further compressed by encoding the non-zero delta model parameters such that each of the encoded non-zero parameters are limited to a predetermined number of bits. According to one embodiment, the non-zero delta model parameters may be encoded using a quantization technique, such as an N-bit Laplacian distribution Lloyd-Max quantization. Such quantization may include a table look-up of indices in pre-computed quantization tables. In order to limit the size of such tables, the delta model parameters may be shifted and scaled to zero mean, unit standard deviation values as described at 140 of FIG. 8A. Each of the scaled delta parameters may then be quantized to an N-bit index of a Lloyd-Max quantization table.

At 260, the compressed delta model parameters are then placed in storage or transmitted across a data network along with the zero vectors for each parameter type and the mean and standard deviation.

The size of the file compressed model size can be controlled by: 1) the number of quantization bits N that are used, 2) the value of $\epsilon$ used to determine whether a delta parameter is zero and 3) setting the maximum number of delta model parameters which can be declared non-zero (i.e. this is essentially automatically setting $\epsilon$ to values such that the desired number of non-zero parameters are obtained). By using these settings, substantial compression can be achieved with varying losses and performance.

FIG. 9C is a diagram illustrating the storage requirements of an adapted speaker model after differential compression according to one embodiment. As shown, M-bit zero vectors 290a, 292a, and 294a are stored for each of the parameter types (i.e., weight, mean and variance respectively). The zero vectors identify states of the delta model that have parameter values equal to, or approximately equal to, zero. For example, the zero vector for the delta weight 290a identifies states 2, 4 and 5 as having zero-valued delta weight parameters. Thus, when regenerating the individual speaker model, states 2, 4, and 5 may be regenerated by copying or referring to mixture weights $\omega_B(2)$, $\omega_B(4)$, and $\omega_B(5)$ from the background model.

The remaining states are states of delta model that have non-zero parameter values, which are stored as compressed delta model parameters. For example, zero vector 290a identifies states 1 and 3 as having non-zero valued delta weight parameters, which are stored as compressed delta model weight parameters 290b. Thus, when regenerating the speaker model from the delta model and the background model, states 1 and 3 may be generated by adapting the background model parameter sets with the compressed delta model parameters that are stored 290b.

Similarly, zero vector 292a indicates that the mean vectors for states 2 and 4 may be regenerated by copying or referring to mean vectors $\mu_B(2)$ and $\mu_B(4)$ from the background model, while the mean vectors for states 1, 3, and 5 may be generated by adapting the background model parameters $\mu_B(1)$, $\mu_B(3)$, and $\mu_B(5)$ with the compressed delta model parameters that are stored 292b. Zero vector 294a indicates that the variance vectors for states 1, 3, and 5 may be regenerated by copying or referring to mean vectors $\partial_B(1)$, $\partial_B(3)$, and $\partial_B(5)$ from the background model, while the variance vectors for states 2 and 4 may be generated by adapting the background model parameters $\partial_B(2)$ and $\partial_B(4)$ with the compressed delta model parameters that are stored 294b.

FIG. 10A is a diagram illustrating a method of differential compression on a realigned speaker model according to one embodiment. In this embodiment, the individual speaker model is originally generated such that the modeled states of the individual and background speaker models do not correspond to the same vocal state. In order to realign the modeled states such that they do correspond to the same vocal states, parameter sets of the speaker model are mapped to corresponding parameter sets of the background model according to a minimal difference test. Through realignment of the modeled states, the realigned speaker model and the background model may have corresponding states in which the modeled distributions of acoustic features are equal or approximately equal. Thus, further compression may be achieved by only storing delta model parameters having non-zero values as described in FIGS. 9A-9C.

At 310, a speaker model is provided for compression.

At 320, a background model serving as a baseline model is provided.

At 330, parameter sets of the speaker model are mapped to corresponding parameter sets of the background model. According to one embodiment, a Gaussian distance measure is computed between the mean vector of a particular speaker model state and for each of the background model states. The state of the background model that has the least difference as compared to the modeled state of speaker model is then mapped to the parameter set of the speaker model. This is performed until all of the parameter sets of the speaker model are mapped to a corresponding parameter set of the background model. Such mappings may be stored in a mapping vector 390 as illustrated in FIG. 10B. As shown, the mapping vector 390 specifies a mapping between a parameter set identified for a particular state of the background model to a corresponding state of the speaker model.

At 340, the speaker model is compressed into the delta model by computing the difference between the mapped sets of individual speaker and background parameters, as described at 130 of FIG. 8A. The mapping vector 390 may be referenced to determine the corresponding background parameter sets for a particular parameter set of the speaker model.

At 350, the delta model parameters are determined for those that have non-zero values. Again, this is performed by computing a zero vector for each of the parameter types as illustrated and discussed with reference to 240 of FIG. 9B.

At 360, the delta model parameters having non-zero values may be further compressed through encoding to limit each of the non-zero delta parameters to a predetermined number of bits, as described at 250 of FIG. 9B.

At 370, the compressed delta model parameters are then placed in storage or transmitted for further processing, along with the zero vectors for each parameter type, the mapping vector 390, and the mean and standard deviation.

Figure 11A:
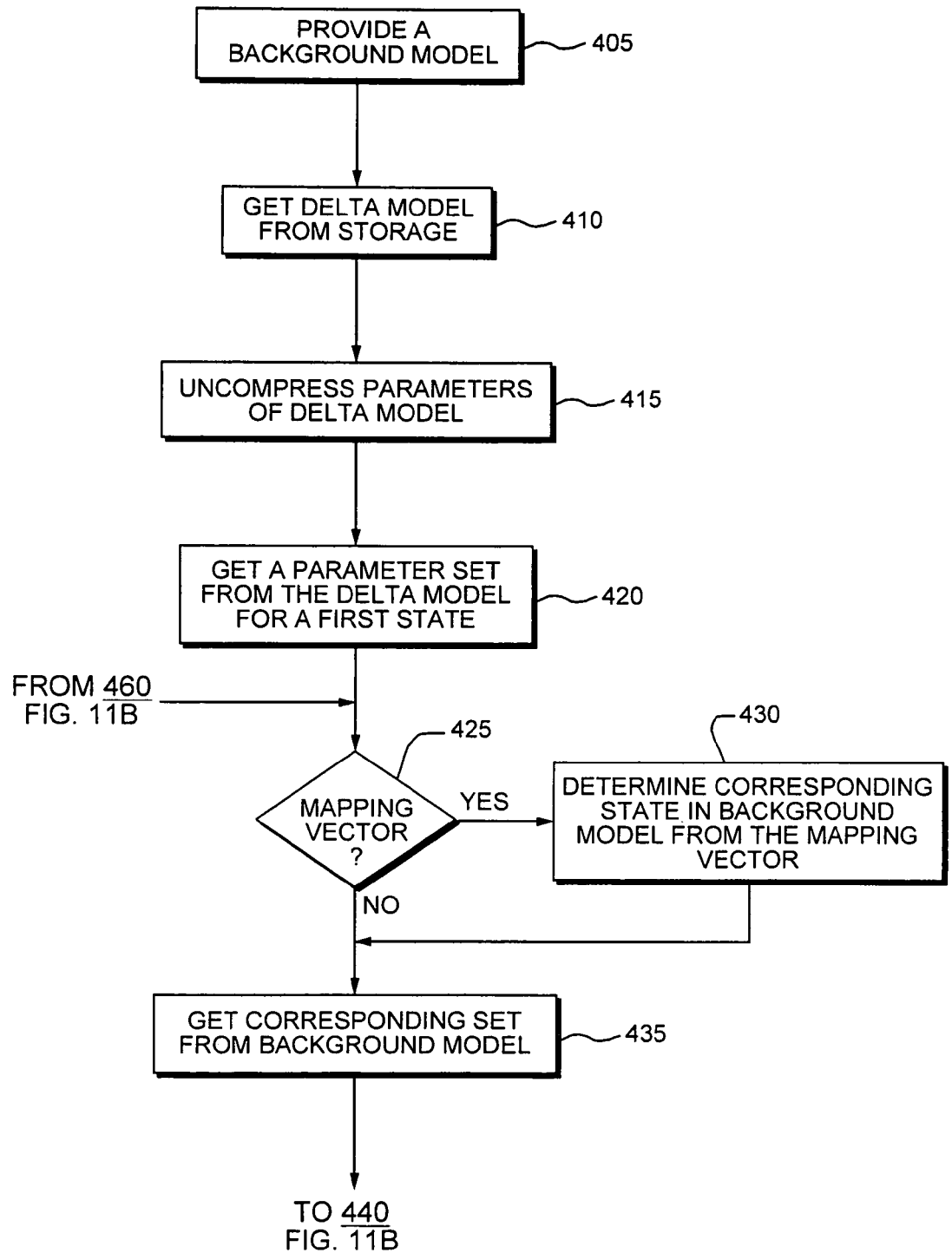
FIGS. 11A and 11B is a flow diagram illustrating a method of decompression according to one embodiment.
Figure 11B:
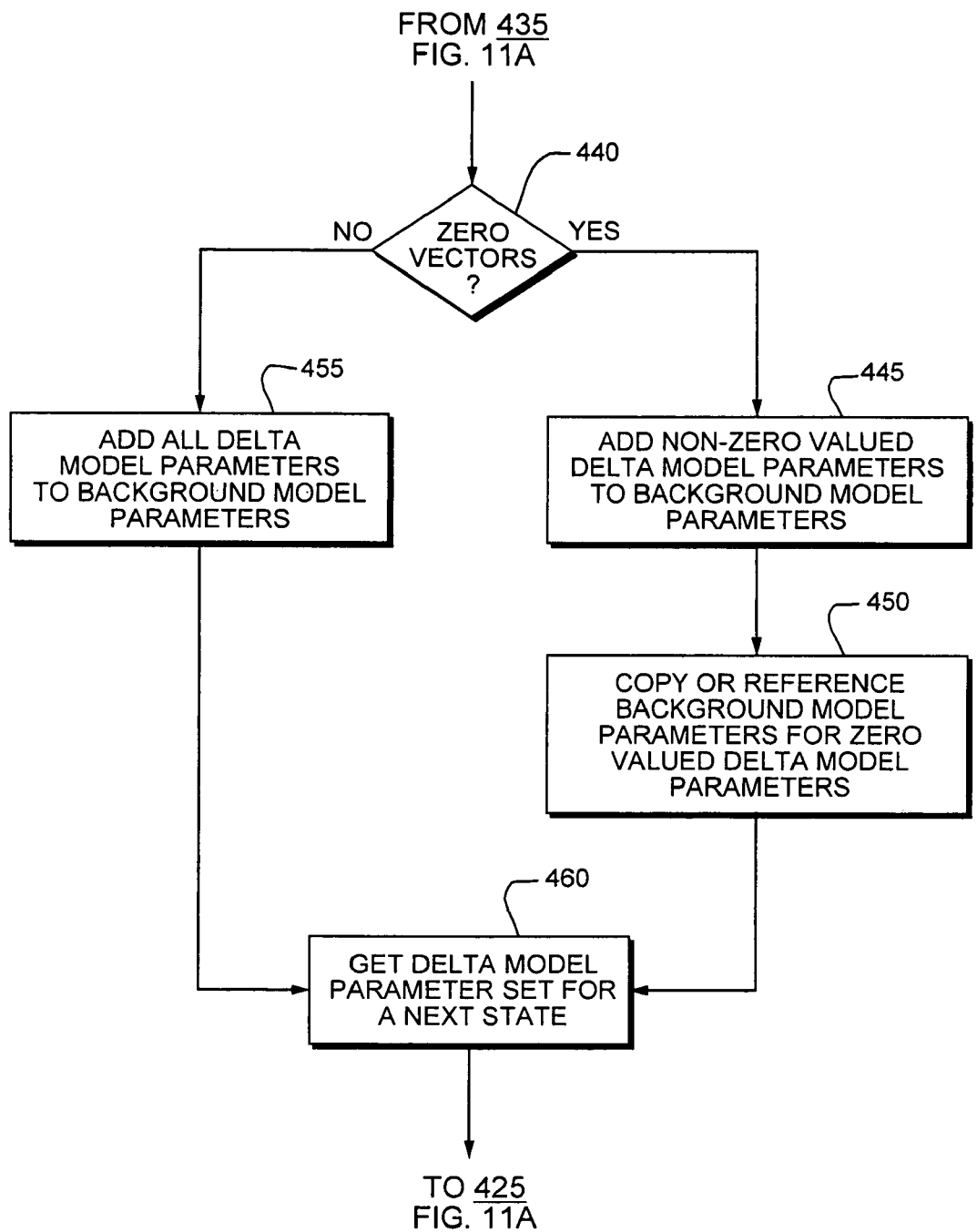

FIGS. 11A and 11B is a flow diagram illustrating a method of decompression according to one embodiment. In decompression, a single background model may serve as the basis for regenerating multiple individual speaker models from compressed delta models. Thus, more speaker models may be stored as compressed delta models within a fixed amount of storage space.

At 405, a background model is provided from storage to serve as a baseline for regenerating the original speaker model from its compressed delta model. Preferably, the background model is the same model used to compress the original speaker model.

At 410, a compressed delta model corresponding to the particular speaker model is retrieved from storage.

At 415, the parameters of the delta model are decompressed. According to one embodiment, the delta model parameters may have been compressed by encoding the parameters using a quantization technique, such as Gaussian distribution Lloyd-Max scalar quantization. As such, these encoded parameters may be indices to a pre-computed quantization table. By using the encoded parameters as indices to the tables, the original delta model parameters may be determined. If the delta model parameters were shifted and scaled to zero mean, unit standard deviation values prior to quantization during compression, further processing may be necessary to return the original values of the delta model parameters. According to one embodiment, the mean and standard deviation values computed at 140 of FIG. 8A may be retrieved from storage in order to reverse the shifted and scaled values.

At 420, a parameter set for a first state is obtained from the delta model.

At 425, a determination is made as to whether the states of the original speaker model were aligned with the states of the background model, resulting in a mapping vector being stored. If so, the process proceeds to 430, to determine which state in the background model corresponds to the state of the selected parameter set. This determination may be performed by using the state of the selected parameter set as an index into the mapping vector, resulting in the determination of the corresponding background state.

At 435, the parameter set of the corresponding state from the background model is obtained.

At 440, a determination is made as to whether there are any zero vectors associated with the delta model parameters indicating whether any of the delta model parameters are zero. If so, only non-zero valued delta model parameters were stored during compression and the process proceeds to 445.

At 445, the zero vector is referenced to determine the non-zero delta model parameters that were stored. These non-zero parameters are added to their corresponding background model parameters resulting in an original speaker model parameter. According to one embodiment, such addition may be vector addition. For zero-valued delta model parameters, the process proceeds to 450.

At 450, the zero vector is referenced to determine the zero-valued delta model parameters that were not stored. If the zero vector indicates that a delta model parameter is zero, the corresponding speaker model parameter is regenerated by copying or referencing the corresponding background model parameter for that parameter set.

If there are no zero vectors, the process proceeds to 455, in which each of the delta model parameters are added to the corresponding background model parameters in order to regenerate a parameter set of the original speaker model.

At 460, the delta model parameter set for the next state is retrieved and the process proceeds back to 425. Once all of the states have been regenerated, the speaker model is complete and may be used to a variety of application, such as speaker verification.

Figure 12:
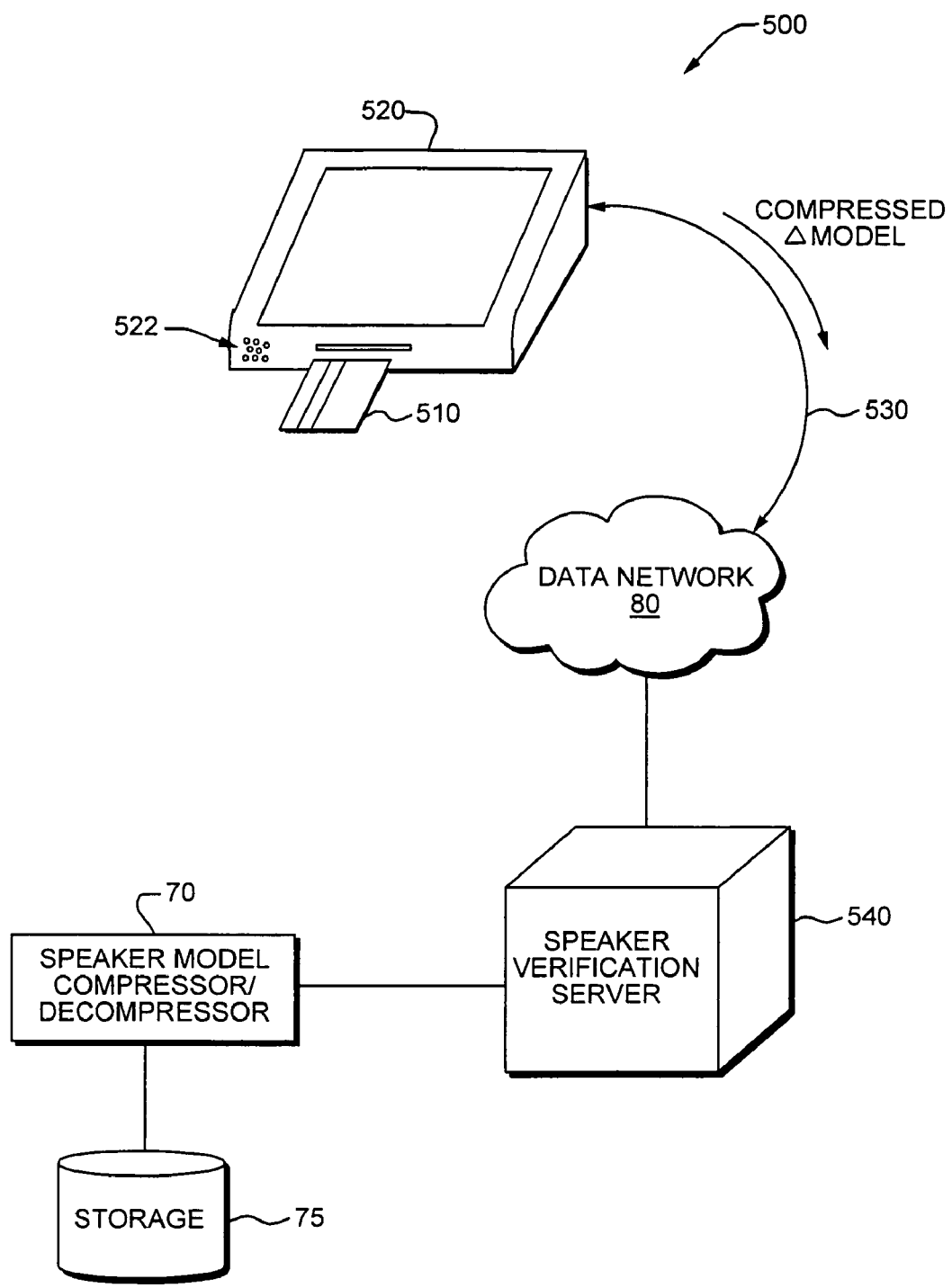
FIG. 12 is a diagram illustrating a potential application of differential compression according to one embodiment.

FIG. 12 is a diagram illustrating a potential application of differential compression according to one embodiment. As shown, the model compressor 70 may be a part of a speaker verification server 540 which connects to a data network 80 through which it accesses a kiosk 520. The person may have access to the system 500 by verifying his or her identity by placing a smart card 510 into an input of the kiosk 524. The smart card 510 may include the compressed delta model parameters for that speaker. The delta model would be transmitted over a link 530 to the data network 80 which connects to the speaker verification server 540. The server 540 may then send the compressed delta model to the model compressor 70 in order to regenerate the individual speaker model from the background model. With the regenerated speaker model, the speaker can then verify his or her identity by speaking into the microphone 522 which transmits feature vectors of the person's voice over the network to the speaker verification server to compare the extracted feature vectors with the speaker model.

Those of ordinary skill in the art realize that methods involved in a method and apparatus for differential compression of speaker models may be embodied in a computer program product that includes a computer usable medium. For example, such a computer usable medium can include a readable memory device, such as a hard drive device, a CD-ROM, a DVD-ROM, a computer diskette or solid-state memory components (ROM, RAM), having computer readable program code segments stored thereon. The computer readable medium can also include a communications or transmission medium, such as a bus or a communications link, either optical, wired, or wireless, having program code segments carried thereon as digital or analog data signals.

While this invention has been particularly shown and described with references to preferred embodiments thereof, it will be understood by those skilled in the art that various changes in form and details may be made therein without departing from the scope of the invention encompassed by the appended claims.

What is claimed is:

1. A method for compressing speaker models, comprising:
   providing a speaker model that is characterized by sets of speaker model parameters;
   providing a baseline model that is characterized by sets of baseline model parameters;
   compressing the speaker model into a delta model that is characterized by sets of delta model parameters, each delta model parameter of the sets of delta model parameters being the difference between a corresponding speaker model parameter of the sets of speaker model parameters and a corresponding baseline model parameter of the sets of baseline model parameters.

2. The method of claim 1, further comprising:
   providing a plurality of speaker models; and
   compressing the plurality of speaker models into a plurality of delta speaker models from the baseline model.

3. The method of claim 1, further comprising:
   further compressing the delta model by encoding each delta model parameter from the sets of delta model parameters, such that each of the encoded parameters is limited to a predetermined number of bits.

4. The method of claim 3, wherein the delta model parameters are encoded using Lloyd-Max scalar quantization.

5. The method of claim 1, wherein the speaker model is adapted from the baseline model, and further comprises:
   determining delta model parameters from the sets of delta model parameters having non-zero values;
   compressing the delta model by encoding the delta model parameters having non-zero values, such that each of the encoded parameters is limited to a predetermined number of bits.

6. The method of claim 5, wherein a delta model parameter is determined to have a non-zero value if it is greater than a predetermined threshold value.

7. The method of claim 1, further comprising:
   mapping each of the sets of speaker model parameters to a corresponding set of baseline model parameters prior to generating the delta model, such that the difference between mapped sets of speaker model parameters and baseline model parameters is minimal.

8. The method of claim 1, wherein the speaker model and the baseline model are Gaussian mixture models.

9. The method of claim 8, wherein each set of the sets of speaker model parameters comprises a weight, a mean vector, and a variance vector.

10. The method of claim 1 wherein the baseline model is a background speaker model.

11. The method of claim 1 further comprising:
    decompressing the delta model to regenerate the speaker model by combining the delta model with the baseline model.

12. An apparatus for compressing speaker models, comprising:
    a compressor receiving a speaker model that is characterized by sets of speaker model parameters;
    the compressor receiving a baseline model that is characterized by sets of baseline model parameters;
    the compressor compressing the speaker model into a delta model that is characterized by sets of delta model parameters, each delta model parameter of the sets of delta model parameters being the difference between a corresponding speaker model parameter of the sets of speaker model parameters and a corresponding baseline model parameter of the sets of baseline model parameters.

13. The apparatus of claim 12, further comprising:
    the compressor receiving a plurality of speaker models; and
    the compressor compressing the plurality of speaker models into a plurality of delta speaker models from the baseline model.

14. The apparatus of claim 12, further comprising:
    the compressor further compressing the delta model by encoding each delta model parameter from the sets of delta model parameters, such that each of the encoded parameters is limited to a predetermined number of bits.

15. The apparatus of claim 14, wherein the delta model parameters are encoded using Lloyd-Max scalar quantization.

16. The apparatus of claim 12, wherein the speaker model is adapted from the baseline model, and further comprises:
    the compressor determining delta model parameters from the sets of delta model parameters having non-zero values;
    the compressor compressing the delta model by encoding the delta model parameters having non-zero values, such that each of the encoded parameters is limited to a predetermined number of bits.

17. The apparatus of claim 16, wherein a delta model parameter is determined to have a non-zero value if it is greater than a predetermined threshold value.

18. The apparatus method of claim 12, further comprising:
the compressor mapping each of the sets of speaker model parameters to a corresponding set of baseline model parameters prior to generating the delta model, such that the difference between mapped sets of speaker model parameters and baseline model parameters is minimal.

19. The apparatus of claim 12, wherein the speaker model and the baseline model are Gaussian mixture models.

20. The apparatus of claim 19, wherein each set of the sets of speaker model parameters comprises a weight, a mean vector, and a variance vector.

21. The apparatus of claim 12 wherein the baseline model is a background speaker model.

22. The apparatus of claim 12 further comprising:
the compressor decompressing the delta model to regenerate the speaker model by combining the delta model with the baseline model.

23. A method for compressing speaker models, comprising:
providing a speaker model that is characterized by sets of speaker model parameters;
providing a baseline model that is characterized by sets of baseline model parameters;
compressing the speaker model into a delta model that is characterized by sets of delta model parameters, the sets of delta model parameters being the difference between the sets of speaker model parameters and the sets of baseline model parameters;
determining delta model parameters from the sets of delta model parameters having non-zero values; and
compressing the delta model by encoding the delta model parameters having non-zero values.

24. An apparatus for compressing speaker models, comprising:
a compressor receiving a speaker model that is characterized by sets of speaker model parameters;
the compressor receiving a baseline model that is characterized by sets of baseline model parameters;
the compressor compressing the speaker model into a delta model that is characterized by sets of delta model parameters, the sets of delta model parameters being the difference between the sets of speaker model parameters and the sets of baseline model parameters;
the compressor determining delta model parameters from the sets of delta model parameters having non-zero values; and
the compressor compressing the delta model by encoding the delta model parameters having non-zero values.

* * * * *

UNITED STATES PATENT AND TRADEMARK OFFICE
CERTIFICATE OF CORRECTION

PATENT NO. : 7,379,868 B2
APPLICATION NO. : 10/336653
DATED : May 27, 2008
INVENTOR(S) : Douglas A. Reynolds Page 1 of 1

It is certified that error appears in the above-identified patent and that said Letters Patent is hereby corrected as shown below:

In column 1, lines 14-16, please delete "The invention was supported, in whole or in part, by a grant F19628-00-C-0002 from the FBI. The Government has certain rights in the invention." and insert -- This invention was made with government support under Grant No. F19628-00-C-0002, awarded by the US Air Force. The government has certain rights in this invention. --

Signed and Sealed this
Tenth Day of May, 2011

David J. Kappos
*Director of the United States Patent and Trademark Office*